(12) United States Patent
Hjelm et al.

(10) Patent No.: US 7,925,272 B2
(45) Date of Patent: Apr. 12, 2011

(54) ARRANGEMENT AND METHOD FOR A LOCATION DATABASE

(75) Inventors: Johan Hjelm, Tokyo (JP); Mikael Lind, Sollentuna (SE); Helena Lind, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 361 days.

(21) Appl. No.: 11/577,205

(22) PCT Filed: May 31, 2005

(86) PCT No.: PCT/SE2005/000814
§ 371 (c)(1),
(2), (4) Date: Jul. 10, 2009

(87) PCT Pub. No.: WO2006/041342
PCT Pub. Date: Apr. 20, 2006

(65) Prior Publication Data
US 2009/0280837 A1    Nov. 12, 2009

(30) Foreign Application Priority Data
Oct. 15, 2004 (SE) .................................. 0402510

(51) Int. Cl.
*H04W 24/00* (2009.01)
(52) U.S. Cl. ............... 455/456; 455/456.6; 455/456.1; 455/456.2; 455/456.3; 455/457; 455/404.2; 455/414.3; 455/440

(58) Field of Classification Search ............. 455/456.6; 701/204, 211
See application file for complete search history.

(56) References Cited

U.S. PATENT DOCUMENTS

| | | | |
|---|---|---|---|
| 5,657,487 A | 8/1997 | Doner | |
| 6,266,533 B1 | 7/2001 | Zadeh et al. | |
| 6,363,392 B1 | 3/2002 | Halstead et al. | |
| 6,477,362 B1 | 11/2002 | Raith et al. | |
| 6,477,379 B2 | 11/2002 | Kingdon | |
| 2003/0101150 A1 | 5/2003 | Agnihotri et al. | |
| 2004/0128066 A1* | 7/2004 | Kudo et al. | 701/204 |

FOREIGN PATENT DOCUMENTS

| | | |
|---|---|---|
| JP | 2003-196284 A | 7/2003 |
| JP | 2004-038871 | 5/2004 |
| WO | WO 01/95592 A | 12/2001 |

OTHER PUBLICATIONS

Anonymous: "Airflash SmartZone Platform" Internet Citation, Oct. 21, 2001, XP002294236.
Kleiman Eve: "Combining wireless location services with enterprise ebusiness applications" Proceedings of Map Asia Conference, Aug. 7, 2002, pp. 1-11, XP002294235 Conference Proceedings Article.

* cited by examiner

*Primary Examiner* — David Q Nguyen

(57) ABSTRACT

The present invention relates to the field of location databases containing position related information, and specifically to a method of providing quick and accurate response to users requesting location dependant data from such database. This speed-up in response is done by storing information that is related to most probable path for travelling users on top of database stack and therefore is easy to find and sent to requesting users.

9 Claims, 2 Drawing Sheets

ARRANGEMENT AND METHOD FOR A LOCATION DATABASE

TECHNICAL FIELD OF THE INVENTION

The present invention relates to the field of location databases containing position related information. More specifically, the invention relates to a method of providing quick and accurate responses to users requesting location dependant data from such database.

The invention relates particularly, although not exclusively, to a location database where indices of the database records are based on users behaviour and movements.

DESCRIPTION OF RELATED ART

Today's cellular communications systems offer various communication services. Some communication services also rely on positioning information that accurately characterise the coordinates of mobile stations within a service area. For example, one of the communication services supported is a location service that allows a subscriber's position to be communicated to third party service providers. The third party service providers may offer various location dependant services requiring the position information. For example, positioning information is needed for fleet management of trucks and containers. Other location dependant services may include providing localized content to subscribers, i.e. advertising, directions to nearest restaurant, gas station etc.

Advances in telecommunications technology have also enabled faster and more accurate location of users carrying mobile terminals. Examples of such technology are described in U.S. Pat. Nos. 6,477,362 and 6,477,379. These patents respectively describe systems for directing emergency services to a user based on her or his location and for locating a mobile device with the aid of two base stations.

Another technology to determine position of a mobile device is Global Positioning System (GPS), which utilizes signals transmitted by a number of in-view satellites to determine the location of a GPS antenna, which is connected to a receiver within, for example, a mobile device. This can for example be seen in U.S. Pat. No. 6,266,533.

Furthermore U.S. Pat. No. 5,657,487 describes a location process, where it is possible to determine both the location and speed of a mobile station, and thus determine the direction of a moving mobile device.

Location based services in databases needs some way to be managed and searchable, which can be done by indexing the information. One form of spatial indexing for storing and accessing location sensitive information in databases is disclosed in U.S. Pat. No. 6,363,392.

SUMMARY OF THE INVENTION

One problem users can have with location based services occurs when they are entering an area and they do not know what is available in the area. If the database is very large, the search in the index can take a relatively long time and effect response time to the user. If the user is travelling along a path he might already have passed a point of interest, which lies along the path, when response is received.

A problem within databases handling location based services is if there are areas where the database is updated often (i.e. parameter sets), the index creation will be costly in terms of resources.

Another problem is that most location dependent services are based on the actual absolute position of the user, not the speed and direction, which may cause misled information to be provided to users moving in an area.

Accordingly, the object of the present invention is to solve the problems associated with long response times and inaccurate responses to information requests.

The database of the present invention is spatially enabled. There are a number of spatial indexing methods that may be used to geographically identify a described or addressed location. In other words, there are numerous ways to convert coordinates, such as, for instance, latitude and longitude into a geographic coding that may be used for indexing into a database.

The invention solves this by pruning indices for most probable path and only keeping information for most probable path, i.e. relevant information for the majority of all users.

Another way of solving this is to simply putting them on top of the database stack, letting them be found first during browsing or searching in the database.

Additionally, to even more fasten up response time pushing information for most probable path to users, letting them already have the information locally in their terminals.

One advantage of this is the minimization of response time for an information request.

Another advantage is to provide accurate information to users along a specified, most probable, path.

One advantage related to the database is savings of calculation resources by only update indices for the most probable path or top of database stack, instead of doing it for the while database.

DESCRIPTION OF PREFERRED EMBODIMENTS

Figure 1:
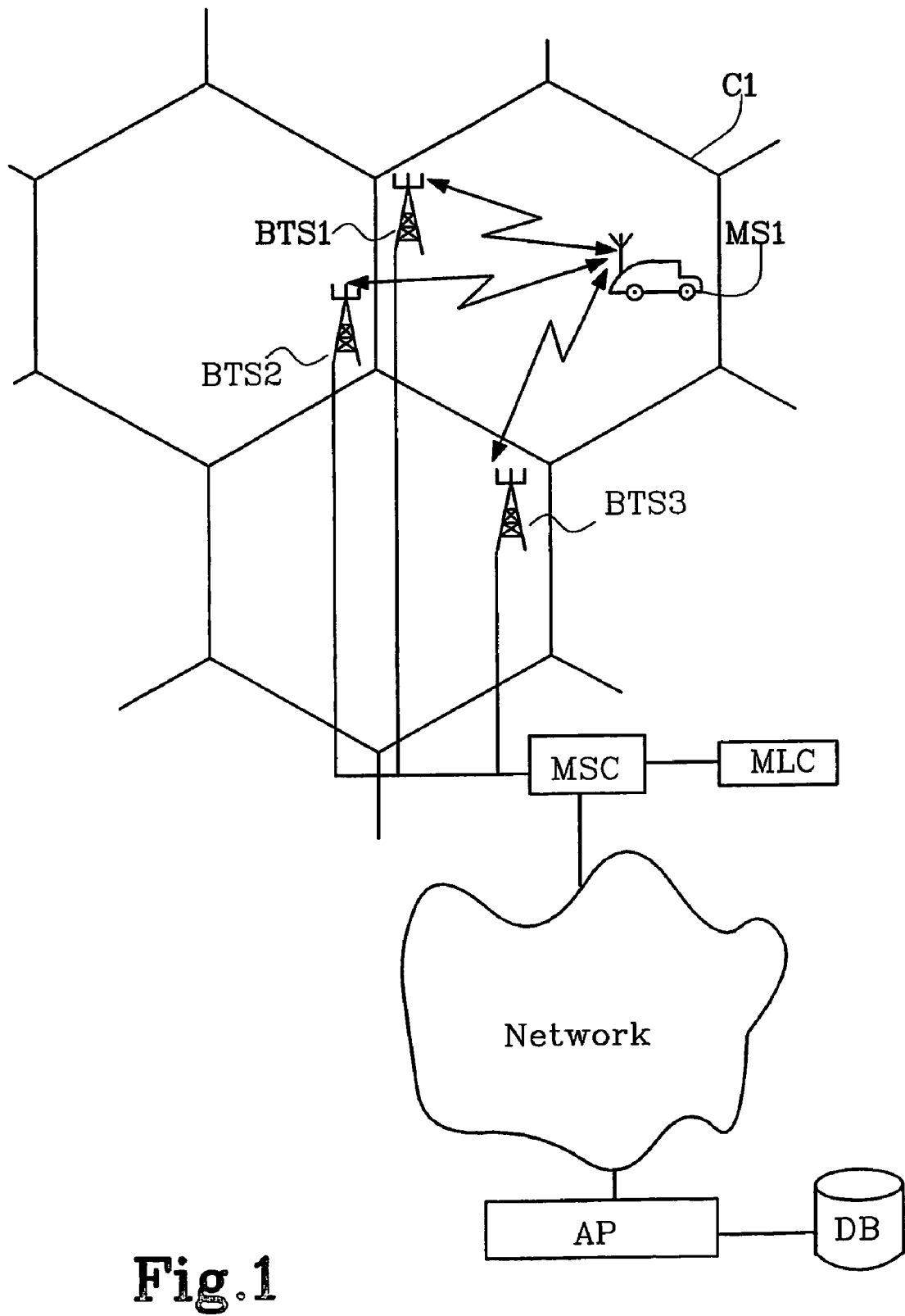
FIG. 1 shows a system overview of a telecommunications system where a location database is used.

The main components of a general cellular telecommunications system shown in FIG. 1 are a plurality of base stations BTS1-BTS3 connected to one or more mobile service switching centers MSC. Base stations BTS1-BTS3 serve different parts of the cellular system, for example serves base station BTS1 the cell C1 where user MS1 resides. Though user MS1 can at the same time uphold communication with base stations BTS2 and BTS3 for determining if they provide better connection or service, or in the case of moving and needing to handover to another cell served by another base station.

For positioning purposes the mobile service switching center MSC is also connected to a mobile location center MLC that handles positioning requests from the subscribers. The mobile locations center MLC can also be connected to a reference GPS receiver providing absolute GPS time to the MLC and the network, for use in so called assisted GPS (A-PGS), a method of positioning where GPS and base stations are used in combination to determine position of a requesting subscriber.

The MSC is then connected to the network for connecting the subscriber to other subscribers or access to services and applications. These applications can be hosted within the operators network or outside the actual network by an external service provider as shown in FIG. 1 where the application AP and database DB connected to it is placed outside the network. This application AP can for example be the location based service providing subscribers with location based information, for example restaurants, stored in the database DB.

The database DB is the storing place for the location based information subscribers can request. Furthermore the database DB is spatially enabled. There are a number of spatial indexing methods that may be used to geographically identify a described or addressed location. In other words, there are numerous ways to convert coordinates, such as, for instance, latitude and longitude into a geographic coding that may be used for indexing into a database.

Indexing of this particular database is based on user statistics and behaviour. Traffic logs or old requests can form the basis for this statistics, which by analysis can show what paths most users take through the area in question. Next step in indexing the database is to determine what points of interests can be found along the route most users take, and sorting records related to these points of interest on the top of the database structure or in main memory, depending on how the database and service are constructed.

Figure 2:
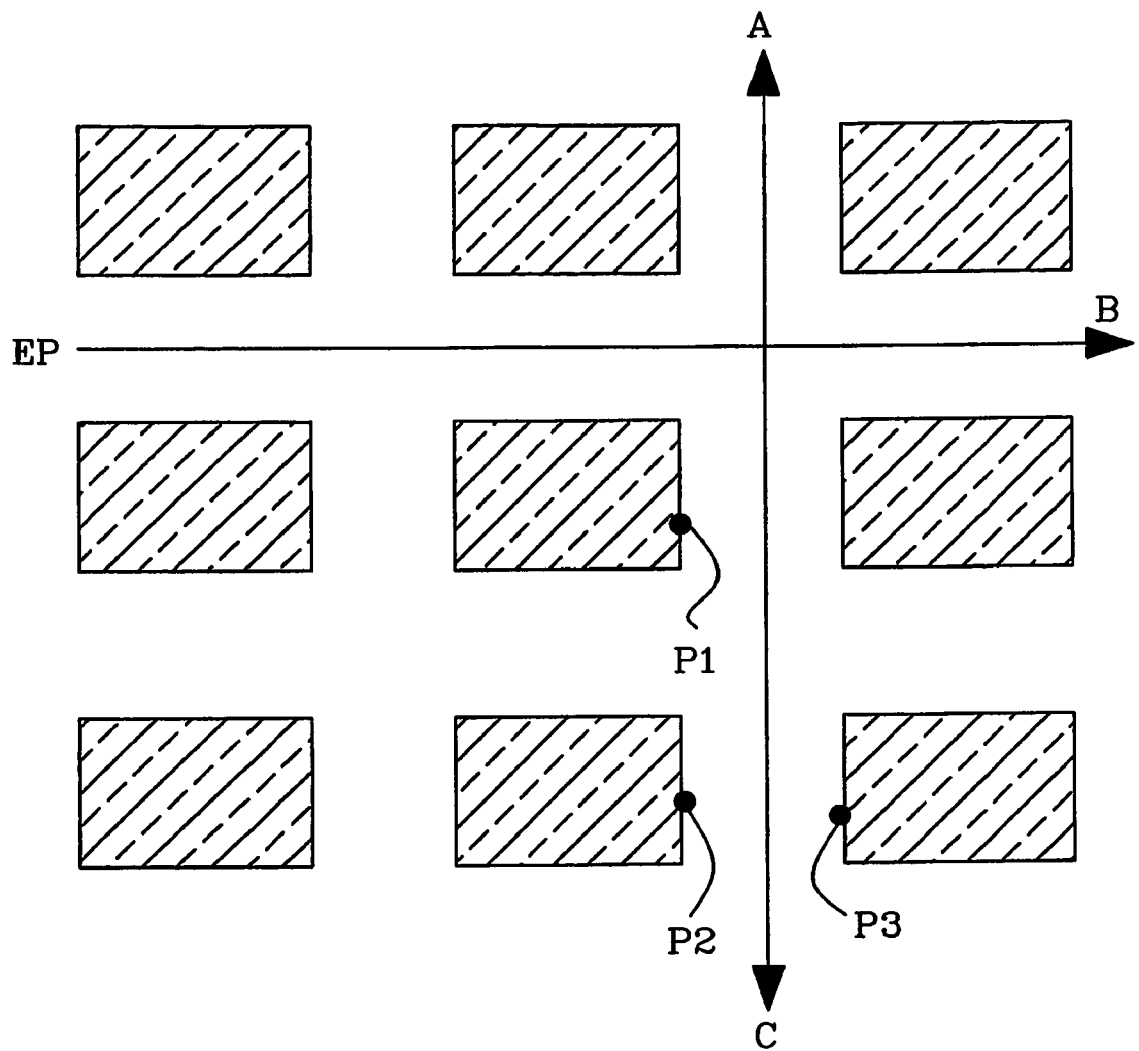
FIG. 2 shows a schematic overview of an area covered by the location database, with different user paths.

One example of the result of analysis of user statistics can have the model of FIG. 2, where statistics have shown that of all users entering the area at entry point EP, 10% continues via path A, 20% choose path B and the remaining major part of 70% choose route C.

This model shown in FIG. 2 results in that data records related to points of interests P1-P3 are saved in the top of database structure or in main memory for fast access.

Another way of building and indexing the database records can be done with basis of physical limitations in the service area, for example one-way streets, dead-end streets and other obstacles that sometimes only can result in one possible path to follow when entering an area.

In such an area served by one or more base stations there may be local services available, such as banks, restaurants, shops, etc. along the route the user is travelling. A user may for example want to know if there is a Japanese restaurant within the area he is visiting or even more detailed; along the path he is travelling.

Then entering in the area at entering point EP, statistics of earlier users or even his own earlier usage, shows that he most likely is to travel via path C. The user then makes the service request on his mobile phone and the database have the most appropriate response stored at the top of the database structure, i.e. searching is not necessary, and response time is very fast.

Another mode of operation of the database and service is to push information about points of interest along path C already when users pass entry point EP. This results in users having related information about points of interest P1-P3 long before reaching them, giving them the option of choosing among them or requesting more detailed information, dinner menus for example.

Furthermore, subsets of the database can be pushed to users who are travelling through a city, i.e. passing through a block and moving into a new one where new points of interest may be interesting for the user.

All pushing of Information can be matched to a profile of user, where the user in before has entered his food interests for example. I.e. "I like Japanese food and would like to get info about Japanese restaurants along most probable path".

The invention is not limited to the above described embodiments, but can changed and modified without departing from the invention; for example changes in the environment can cause changes to the above-described structure. The location database can for example be incorporated in another kind of database or subscriber record database, and the communication system can be any system that provides data communication supporting any kind of positioning system.

The invention claimed is:

1. A method in a cellular telecommunication system for providing location dependent information to subscribers, the method comprising the steps of:
   an application node, connected to the cellular telecommunication system, that provides the location dependent information to subscribers and performs the following steps:
      storing the location dependent information in a spatially enabled database associated with the telecommunication system;
      spatially indexing the location dependent information in the database to geographically identify specific locations;
      determining routes that most subscribers take through a specific area in the telecommunication system;
      determining points of interest along the determined routes;
      sorting records related to the points of interest on top of the database structure; and
      pruning indices for least probable routes in the database.

2. The method of claim 1, further comprising associating the spatial indices to subscriber behavior.

3. The method of claim 2, wherein the subscriber behavior is behavior is based on movements of the subscriber within the telecommunication system.

4. The method of claim 1, further comprising the step of determining and sending indices of a most probable route to the subscriber when the subscriber is in an area covered by location data in the database.

5. The method of claim 1, wherein the determining routes step further comprises calculating a most probable path through the specific area utilizing at least one subscriber's historical route data.

6. The method of claim 1, wherein the determining points of interest step further comprises, pushing information about the points of interest along the subscriber's most probable route to the subscriber when the subscriber passes an entry point to the most probable route.

7. A method in a cellular telecommunication system for providing location dependent information to subscribers, the method comprising the steps of:
   an application node, connected to the cellular telecommunication system, that provides the location dependent information to subscribers and performs the following steps:
      storing the location dependent information in a spatially enabled database associated with the telecommunication system;
      spatially indexing the location dependent information in the database to geographically identify specific locations;
      determining routes that most subscribers take through a specific area in the telecommunication system;
      determining points of interest along the determined routes;
      sorting records related to the points of interest on top of the database structure; and
      storing least probable paths in secondary memory of the database.

8. A method for providing location dependent data to subscribers connected to a cellular communication system, said method comprising the steps of:

an application node, connected to the cellular telecommunication system, that provides the location dependent information to subscribers and performs the following steps:
  using location database in which location dependent data is stored, wherein the location dependent data is provided to the subscribers and associated with geographical indices sorted based on statistics of movements of subscribers; and
  sending the location dependent data to a requesting subscriber of location determination when the requesting subscriber is residing in an area covered by the geographical indices in the location database, wherein the location dependent data corresponds to the most probable path based on the statistics of movements of the subscribers,
wherein the first provided location dependent data is associated with the geographical indices corresponding to the most probable path of the requesting subscriber,
wherein the location database stores the location dependent information by:
  spatially indexing the location dependent information in the database to geographically identify specific locations;
  determining paths that most subscribers take through a specific area in the telecommunication system;
  determining points of interest along the determined paths;
  sorting records related to the points of interest on top of the database structure; and
  pruning indices for least probable paths in the database.

9. A method for providing location dependent data to subscribers connected to a cellular communication system, said method comprising the steps of:
an application node, connected to the cellular telecommunication system, that provides the location dependent information to subscribers and performs the following steps:
  using location database in which location dependent data is stored, wherein the location dependent data is provided to the subscribers and associated with geographical indices sorted based on statistics of movements of subscribers; and
  sending the location dependent data to a requesting subscriber of location determination when the requesting subscriber is residing in an area covered by the geographical indices in the location database, wherein the location dependent data corresponds to the most probable path based on the statistics of movements of the subscribers,
wherein the first provided location dependent data is associated with the geographical indices corresponding to the most probable path of the requesting subscriber,
wherein the location database stores the location dependent information by:
  spatially indexing the location dependent information in the database to geographically identify specific locations;
  determining paths that most subscribers take through a specific area in the telecommunication system;
  determining points of interest along the determined paths;
  sorting records related to the points of interest on top of the database structure; and
  storing least probable paths in secondary memory of the database.

* * * * *